United States Patent Office 2,870,716
Patented Jan. 27, 1959

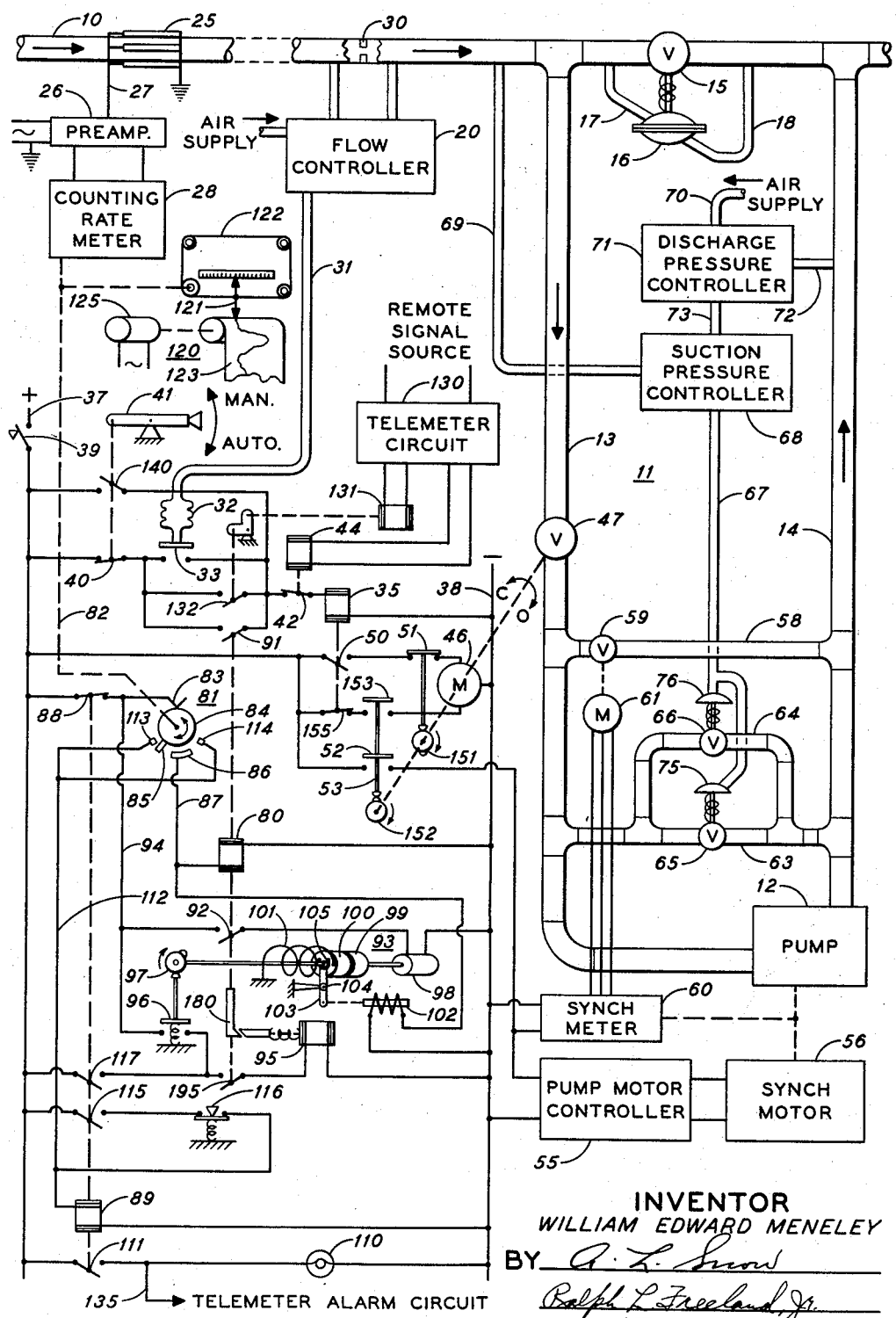

2,870,716

BOOSTER PUMP STATION CONTROL

William Edward Meneley, Oakland, Calif., assignor to California Research Corporation, San Francisco, Calif., a corporation of Delaware Application May 5, 1953, Serial No. 353,129

4 Claims. (Cl. 103—12)

The present invention relates to automatic control systems, more particularly to control systems for maintaining or initiating the operation of a pump of a booster station for a pipe line, and has for an object the provision of a system for controlling the operation of a booster station to prevent entrapment within said station of a volume of material flowing in said pipe line and subsequent intermixing and degrading of a later conveyed product passing through said pipe line by the entrapped material.

In the operation of a pipe line it is frequently necessary to employ booster stations to maintain optimum flow conditions in the line. Dependent upon the type of materials conveyed by the pipe line, the booster station is normally arranged to maintain a predetermined pressure and rate of flow. For example, in the shipment of various petroleum products through a common pipe line, on a "batch" or shipment basis, the resistance to flow through the line will depend upon the viscosity and temperature of the product flowing therein. It will be apparent that with a shipment of heavy fuel oil, as compared to aviation gasoline, in such a pipe line, a booster pump along the pipe line may be called into operation at irregular intervals to maintain the throughput of the pipe line at a substantially constant pressure and rate of flow. The booster station is normally operated in response to a flow condition, such as rate of flow, to bring the booster station into operation and subsequently control the discharge pressure from the booster station. With such means for automatically controlling the operation of the booster station it is possible for the station to be "cut in" while a shipment or first volume of a product in the pipe line is passing through the line adjacent the booster station. Then, subsequently the station may be stopped by an increase in rate of flow so that a subsequent or second volume of fluid may be flowing through the line when the station is again energized. Because of the capacity of the piping required for by-passing fluid into and out of the pump for the booster station, it is possible for a large quantity of the first product to be trapped in the booster station lines and pump. Upon energization of the station after passage of the first volume, there is introduced a sufficient amount of the first volume into the second volume, so that the second volume may be seriously degraded.

Another problem involved in the operation of a booster station for a pipe line carrying successive shipments of dissimilar fluids lies in the volume or size of the interface or intermixed volume of two fluids lying between two successive shipments of fluid. The volume or length of the interface passing the booster station may be quite large, depending on the viscosity of the fluids and the history of the interface therebetween. On the other hand, this volume or length may be quite short due to these same factors. The trapping and subsequent intermixing of any of this interface material with the subsequent product may likewise seriously degrade the following product.

In accordance with the present invention, a control system is provided which prevents undesirable intermixing and consequent degrading of a following product in a pipe line due to the employment of a booster station. This control system includes means for detecting the arrival of an interface between two volumes of material flowing in the pipe line. Further, in accordance with the invention, means are provided for energizing the pump controlling means of said booster station independently of the flow condition, such as rate of flow or pressure which normally controls operation of the station. Timing means are provided which are energized in response to the passage of said interface irrespective of the length or volume of said interface flowing through said pipe line. Said timing means is arranged to terminate control of the booster station and pump by the interface measuring means to return control of said station to the flow condition responsive means after a predetermined time interval.

In a preferred form of apparatus for carrying out the invention, advantage is taken of the use of a radioactive tracer incorporated in the interface between two fluids to initiate the operation of a plurality of Geiger-Mueller tubes and a counting rate meter adapted to measure the intensity of the radioactivity present in said interface. Said counting rate meter is adapted to energize relay means when said radioactivity attains a predeterminable minimum value; the relay means is arranged to override the normal control for the booster pump in response to the measured flow condition in the pipe line. In said preferred form of apparatus for carrying out the present invention, said timing means is actuated in response to the intensity of the radioactivity, as measured by the counting rate meter, falling below said predeterminable minimum value.

An additional feature of the apparatus for carrying out the present invention includes alarm means for detecting and indicating the failure of the radioactivity measuring means to render said timing means and said interface detecting means inoperative.

Further objects and advantages of the present invention will become apparent from the following detailed description taken in conjunction with the accompanying drawing.

In the drawing, there is schematically illustrated a control system in accordance with the present invention for initiating and controlling the operation of a pump of a booster station for a pipe line to prevent entrapment of material within the station dissimilar to that flowing in the line.

Referring now to the drawing, a pipe line 10 adapted to convey products, or fluids, of dissimilar characteristics is provided with a booster station, indicated generally as 11, having a pump 12 arranged to boost the pressure in pipe line 10 by withdrawing fluid therefrom through by-pass inlet line 13 and returning the fluid at higher pressure to line 10 through discharge line 14. As schematically illustrated, a check valve 15 is provided in product line 10 to cause substantially all of the liquid in line 10 to be by-passed through booster station 11 when the pressure in line 14 exceeds that in line 13. In the present embodiment, check valve 15 is indicated as being operable by a fluid-operated diaphragm 16 subjected to inlet pressure through line 17 and outlet or discharge pressure through line 18.

From the foregoing brief description of the booster station, it will be apparent that when pump 12 of station 11 is operated, there is withdrawn from pipe line 10 a volume of fluid representative of the fluid flowing in the pipe line at that time. Because of the volume of lines 13 and 14, as well as the pump 12, it is possible to entrap within booster station 11 a sizeable quantity of the fluid in pipe line 10. As will be explained more fully hereinafter, pump 12 is arranged to be intermittently operated in response to a flow condition which, in the present embodiment, is the rate of flow as measured by flow controller 20. Since the rate of flow in line 10 will depend upon the type of product flowing and the flow conditions through the line, it is possible for the rate of flow in line 10 to increase independently of the operation of the booster pump in response to the measured variable, rate of flow. Accordingly, the booster station may be shut down by an independent increase in rate of flow with a portion of the product then flowing in the line trapped within the booster station. If the booster station is not energized until the next interface arrives or the subsequent shipment of uncontaminated material is in transit through pipe line 10, there may be pumped into the subsequent shipment the dissimilar product of the prior shipment which may seriously degrade that subsequent product. Additionally, should the booster station not come on the line until the subsequent interface has arrived, there may be lost from the first shipment a valuable quantity of uncontaminated product.

In avoidance of this undesired mixing of a previous product passing through line 10 and a subsequent product, advantage may be taken of the dissimilar characteristics of the interface between said products at a location upstream from booster station 11 to detect the arrival of the interface. In the preferred form of apparatus illustrated in the drawing, a radioactive material is introduced into the pipe line at the interface between two shipments in the line. Suitable materials for and methods of introducing tracers between successive fluids is disclosed in application Ser. No. 236,384, Mithoff and Hull, filed July 12, 1951, now Patent 2,706,254, assigned to the assignee of the present invention. Other physical conditions of the interface between two fluids, such as change in refractive index of the liquid or change in specific gravity, may be employed for indicating changes in the type of material flowing in line 10. However, in the preferred form of the invention, advantage is taken of the presence of the radioactive tracer incorporated in the interface to detect the arrival of said interface. The measuring means illustrated includes a nest of Geiger-Mueller (G. M.) tubes 25 surrounding pipe line 10 and a single preamplifier 26 connected to said tubes through line 27. Preamplifier 26 and G. M. tubes 25 are located at a predetermined distance upstream from station 11 to permit start-up of the station by the time the leading end of the interface arrives at the station. A counting rate meter 28, desirably located at the booster station, is connected to preamplifier 26 to measure the intensity of radioactivity in pipe line 10 as an indication of the arrival of an interface at said predetermined distance upstream from booster station 11.

In order to explain the operation of the interface arrival detecting means, including counting rate meter 28, preamplifier 26 and G. M. tubes 25 to override control of the booster station in response to the flow, it will first be necessary to explain briefly the control system normally employed to initiate and regulate the operation of pump 12 of booster station 11 when the station is brought on the line. As mentioned hereinabove, booster station 11 operates primarily in response to a flow condition. In the present system that flow condition in line 10 is detected by flow controller 20 measuring the pressure drop across orifice plate 30. Flow controller 20 may be of the pneumatically-operable type so that compressed air may be utilized in line 31 to expand bellows 32 to close an electrical circuit through contactor 33 to place relay 35 across power lines 37 and 38. This circuit for relay 35 is completed through a power switch 39 in positive line 37 and switch 40 of a manual-automatic selector switch 41 and a normally closed contact 42 of a telemetrically-operated relay 44. Upon energization of relay 35 in response to a decrease in rate of flow as measured by flow controller 20, valve-operating motor 46 is rotated in a clockwise direction to initiate the opening of bypass valve 47 in booster intake line 13. The circuit for connecting the forward-field of reversible motor 46 to positive line 37 is provided by contact 50 of relay 35 and normally-closed limit switch 51.

With energization of motor 46 in a clockwise direction, contact 52 of limit switch 53 closes to complete a circuit through positive line 37 to energize pump motor controller 55. Controller 55, in turn, is arranged to operate synchronous motor 56 to drive pump 12. In operation of booster station 11, pump 12 is permitted to circulate fluid from its outlet or discharge side back to its inlet side through bypass line 58 and valve 59, until synchronous motor 56 attains its synchronous speed. In the present arrangement this is accomplished by valve 59 remaining open until synchronous meter 60 achieves its preselected value, namely the synchronous speed of motor 56. At that time, motor 61 is energized by meter 60 to close valve 59. By the closing of valve 59, and with valve 47 open, as mentioned hereinabove, fluid is withdrawn from line 10 through line 13, the pressure raised by pump 12 and discharged back into line 10 through line 14. When the pressure in line 14 exceeds that in line 13, check valve 15 automatically operates to close line 10 and thereby force all of the fluid in line 10 to flow through booster station 11.

Control of the output or discharge pressure line 14, in the present system, is controlled by a pair of bypass valves 65 and 66 operating in parallel lines 63 and 64, respectively. It will be observed that lines 63 and 64 directly connect the discharge side of pump 12 back to the intake side of the pump. Control of valves 65 and 66 is respectively provided by pneumatic operators 75 and 76 operating under air pressure in line 67, controlled jointly by suction pressure controller 68 and discharge pressure controller 71. In a commercial embodiment of the system illustrated schematically in the drawing, primary control of the air supplied to line 67 is provided by controller 68 in response to the inlet or suction pressure measured by pressure-sensing line 69. Input air is supplied to controller 68 through line 73, and discharge pressure controller 71 is adapted to control the air supply to controller 68 in accordance with the pressure in discharge line 14, as measured by sensing line 72. The arrangement is such that when the pressure in discharge line 14 attains a value greater than a predetermined maximum, discharge pressure controller 71 may cut off the air supply to suction pressure controller 68. Such action results in spring-loaded pneumatic operators 75 and 76, opening valves 65 and 66, respectively, and thereby reducing the discharge pressure in line 14.

Shut down of the station is briefly as follows: Booster station 11 is normally controlled by the rate of flow in line 10 increasing and causing controller 20 to open contactor 33 of pressure-bellows 32. Opening of contactor 33 de-energizes relay 35, permitting contact 155 to close to complete a circuit to the reverse-field of motor 46 through contact 153 of limit switch 53. Motor 46 then rotates cams 151 and 152 to the position illustrated while simultaneously closing valve 47. When cam 152 opens limit switch 53, pump motor controller 55 is de-energized to stop booster pump 12.

From the foregoing description it will be appreciated that the system of control for the booster station 11 comprises generally a means for measuring a physical condition of flow, such as rate of flow or pipe line pressure, means for energizing the pump in the booster station in response to a change in said physical condition and means for controlling the output of the booster pump to maintain the physical condition at a substantially constant, predetermined value. It will be apparent that the control means for the booster station may be varied considerably in accordance with the needs of the pipe line and the products flowing therein to fulfill the above minimum requirements for automatic control of the station.

As mentioned hereinabove, inlet and outlet lines, 13 and 14, respectively, for booster pump station 11, as well as pump 12 and bypass lines 58, 63 and 64, may trap within said station a considerable quantity of the fluid flowing in line 10. Such entrapment may occur at a time when there is a change of products being transported in the main pipe line. Additionally, the booster station control system may respond to a change in the flow condition during the passage of the interface containing commingled products of two adjacent shipments. These commingled products may, if intermixed with the following product in the line, result in serious degradation of that product. The volume of the interface depends upon the materials forming that interface and the distance and speed at which it has traveled. As a result, there are great variations in the length thereof and the time required for passage of the interface at a predetermined location along the pipe line, such as adjacent the booster station. While the booster station could be started upon arrival of the interface at a preselected location, and then subsequently operated for a preset time, such a system of operation will not assure that the interface has passed the booster station unless the booster station is arranged to operate continuously throughout passage of the longest possible interface that may be encountered during operation of the line.

In accordance with the present invention, the pump control system is operated in manner to assure that fluid is not trapped in the booster station, irrespective of the size of the interface, by taking advantage of the inclusion of a radioactive tracer material in the interface. As explained in the above-identified Patent 2,706,254 of Mithoff and Hull, this permits identification of the presence of an interface at any preselected location. As further explained in said patent, the interface contains the radioactive tracer material in direct ratio to the extent of contamination of the fluids making up the interface.

As described hereinbefore, the radioactivity measuring means for detecting the radioactive interface includes G. M. tubes 25, preamplifier 26, and counting rate meter 28. The intensity of the radioactivity measured by meter 28 may be indicated by recorder 120, which includes indicator 121, movable by banjo-string 122 to provide a visual indication of said intensity and a permanent record on graph 123 driven by motor 125. Mechanical drive of recorder 120 may be utilized through a mechanical connection indicated schematically as 82, to drive a rotary switch means 81. Switch 81 may be adjusted to control pump 12 of booster station 11 in response to the intensity of the radioactivity of the interface and independently of the flow condition in line 10. Upon increase of the intensity of radioactivity at an upstream location along line 10, where G. M. tubes 25 are located, rotating switch member 84 of switch 81 is rotated to bring finger 85 into engagement with fixed contact 86, thereby to complete a circuit from positive line 37 to relay coil 80 through brush 83 of switch 81, line 87 and normally closed contact 88 of failure alarm relay 89. It will be observed that fixed contact 86 lies intermediate to a pair of contacts 113 and 114 which provide an alarm circuit to energize alarm relay 89 upon failure of any portion of the radioactivity detecting means. Upon energization of coil 80 by an increase of intensity of radioactivity, contact 91 is closed to complete independently an energizing circuit for pump control relay 35. It will be observed that switch 91 is connected substantially in parallel with contactor 33, operated by pneumatic actuator 32 in response to the output of flow controller 20.

It will accordingly be seen that booster pump station 11 may remain energized through relay 80 so long as the radioactivity intensity remains above a predetermined minimum as established by rotary member 84 holding finger 85 in contact with contact 86. The location of fixed contact 86 and the width of said contact will of course predetermine the range of intensity of radioactivity over which relay 80 will be energized. In the preferred manner of operating booster station 11, pump 12 will remain energized so long as an interface containing radioactive tracer material is present adjacent the detecting tubes 25. However, in accordance with the present invention, a control system is provided for maintaining the booster pump energized for a predeterminable time interval following the passage of said interface to insure that after passage of the interface the same material as that present in the pipe line is also present in the booster station. In the present arrangement a timing means, designated generally as 93, controls said predeterminable time interval by controlling the length of time that switch 91 is held closed mechanically after coil 80 is electrically de-energized. It will be observed that relay 80 includes a mechanical latching arrangement indicated as 180 which maintains switch 91 in a closed position after coil 80 has been de-energized. Release of mechanical interlock 180 may be accomplished by tripping relay 95 which is energized through contact 195 of relay 80 and limit switch 96, actuatable by timer 93.

As illustrated schematically, timer 93 includes a motor 98 adapted to drive a first clutch face 99 adapted to engage a driven clutch face 100. Clutch face 100 is normally biased into contact with clutch 99 by coil spring 101, which, as explained later, forms a reset arrangement for cam 97, directly driven by clutch 100. In the operation of timing means 93, provision is made for preventing the operation of cam 97 and limit switch 96 until after the passage of the pipe line interface by the provision of a clutch decoupling solenoid 102. Solenoid 102 is arranged to rotate lever arm 103 about pivot 104 to move yoke 105 and clutch face 100 connected thereto out of engagement with clutch face 99. It will be seen that with coil 102 connected in parallel with coil 80, timing means 93 is normally disengaged throughout the time that radioactivity of the interface has an intensity sufficient to maintain coil 80 energized. Upon decrease in intensity of the radioactivity in line 10 below the predetermined minimum value, thereby indicating the arrival of uncontaminated product in the pipe line and passage of the interface, rotating member 84 of switch 81 is returned to the position illustrated in the drawing, thereby de-energizing coil 102. Under this condition, coil spring 101 acts to bias clutch plates 99 and 100 together to initiate rotation of cam 97. The position of cam 97 and the speed of operation of timing motor 98 will of course determine the time required for operation of limit switch 96 to energize tripping relay 95 through line 94 and contact 195 of relay 80, thereby to stop timing means 93.

As mentioned above, a reset mechanism is provided for cam 97 and timing means 93 by coil spring 101, which not only biases clutch 100 into engagement with clutch 99, but likewise exerts a restoring torque to the drive shaft for cam 97 after disengagement of clutches 99 and 100. This action of coil spring 101 is imparted to the drive shaft of cam 97 when clutch disengaging solenoid 102 is actuated in the manner set forth above. Assuming that timing device 93 has previously been operated to time out and open limit switch 96, the arrival of a subsequent interface in pipe line 10 will result in increased radioactivity and will cause rotation of member 84 of switch 81 to energize both coil 80 and solenoid 102 through fixed contact 86 and line 87. Energization of solenoids 102 will cause clutch 100 to disengage from clutch 99 so that coil spring 101 is free to exert a restoring torque to clutch 100 and cam 97. Accordingly, the reset action of cam 97 is accomplished by the subsequent passage or arrival of another radioactive interface.

While in the present embodiment the actuation of the pump control means, independently of the flow condition which normally controls the pump, has been described as being actuated by a radioactive tracer interface, it will be appreciated by those skilled in the art that various other means for detecting the arrival and passage of an interface may be employed without departing from the present invention. Among the variables which may be used to detect an interface are changes in the specific gravity of the fluid, changes in the refractive index, or changes in an electrical characteristic, such as resistance or impedance. It will be seen that the measurement of any of these variables normally accompanying a change in product flowing in pipe line 10 may be used to actuate and position rotating switch 81 in accordance with a predeterminable change in the measured variable. However, it will be obvious for the reasons set forth above that the detecting system illustrated and described herein is the preferred form of apparatus for carrying out the present invention.

Further, in accordance with the present invention, alarm means may be provided for detecting failure of the interface detecting means to render the independent pump controlling means and the timing means inoperative until such system failure can be repaired. A visual or audible alarm may be provided for indicating the need of attention to the detecting system. In the present arrangement, an open circuit in the Geiger-Mueller tubes 25 would correspond to zero output by counting-rate meter 28, since the counting-rate meter will normally have a background counting rate of a minimum amount due to cosmic rays and other incidental radiation detected by the tubes. If the output of meter 28 falls to a value lower than said minimum, contact finger 85 of rotating switch 81 is arranged to contact 113 which, through line 112, provides an energizing source for relay coil 89. Similarly, a short circuit in G. M. tubes 25 would correspond to a full-scale deflection or maximum output for counting rate meter 28 and result in rotating switch 81 moving its contact 85 into engagement with stationary contact 114. It will be observed that contacts 113 and 114 are connected in parallel with line 112 for energizing coil 89. Energization of coil 89 results in the closing of switch 111 to energize the alarm means which, in the present case, is indicated as a light 110. This same circuit also energizes line 135 which may be connected, as indicated, to a telemeter alarm circuit. Energization of coil 89 provides a lock-in circuit for that coil through switch 115 and reset push-button 116. This circuit is provided to maintain coil 89 energized even after contact 88 is opened to de-energize line 94 and brush contact 83 for rotating switch 81. A further safety feature of this alarm circuit is provided by switch 117, which is operable to open relay 80 upon failure of the radiation detecting equipment and return control of station 11 to flow controller 20. Switch 117 is moved to a closed position by coil 89 to actuate tripping relay 95 through contact 195 of relay 80. It will be apparent that this circuit provides a means for automatically tripping contact 91 upon operation of the alarm device after relay 80 has been closed by the passage of an interface in line 10.

Additional features of the present arrangement include means for providing telemetric control by a remote signal source, indicated schematically in the drawing as 130. This arrangement provides a source of power for the operation of a starting relay 131 adapted to move contact 132 to a closed position and thereby energize the pump station control relay 35. It will be observed that this circuit, including contactor 132, is in parallel with both the flow-control circuit provided through contactor 33, and the independently operated interface control circuit provided by contactor 91 of relay 80. A tripping circuit for the telemetrically operated system is provided by coil 44 adapted to actuate normally closed contact 42.

Manual operation of the entire booster pump station 11 is made possible by manual automatic switch 41, which is arranged simultaneously to open contactor 40 and close contactor 140.

While various modifications and changes in the foregoing control system embodying the present invention will occur to those skilled in the art, all such modifications and changes which fall within the scope of the appended claims are intended to be included therein.

I claim:
1. In combination with a pump in an intermittently operated booster station of a pipe line conveying successive liquid products having different physical characteristics, to prevent mixing thereof, a control system comprising means responsive to flow conditions in said line and associated therewith for energizing said pump, a detector associated with said line and responsive to a first change in a physical property of the liquid passing into said station, means connecting said detector and said flow-responsive means for controlling the flow of liquid through said pump independently of said flow-responsive means, a time-delay means, and means connecting said time-delay means to said detector to restore control of said pump to said flow-responsive means a predetermined time after a second change occurs in a physical property of liquid passing into said station.

2. In combination with a pump in an intermittently operated booster station of a pipe line conveying two successive liquid products having different physical characteristics and separated by a mixed interface, a control system comprising means responsive to flow conditions in said line and associated therewith for energizing said pump, an interface detector associated with said line for liquid passing through said station, means connecting said detector and said flow-responsive means for controlling flow of liquid through said pump independently of said flow-responsive means, and timing means connected to said detector and operable by the response of said detector to passage of the trailing edge of said interface for returning control of said pump to said flow-responsive means after a predetermined time interval, whereby the booster station will remain in operation so long as interface material is contained therein.

3. In combination with a pump in an intermittently operated booster station of a pipe line conveying two successive liquid products separated by an interface containing a radioactive material, a control system comprising means in said pipe line responsive to a physical condition dependent upon flow therein for controlling flow of liquid through said station, a detector for radioactivity adjacent to said pipe line, means connecting said detector and said flow controller for continuing the operation of said pump when said detector output increases to a predetermined value, a delay timer, and means connecting said timer, said detector and said flow controller for delaying the return of control of said pump to said controller for a predetermined time after said detector output decreases to a predetermined value, whereby the booster station will remain in operation so long as interface material is contained therein.

4. A control system for a pump in an intermittently operated booster station of a pipe line conveying successive products, each separated from the other by an interface containing a radioactive material, comprising motor-actuated valve means for controlling the flow of liquid from said pipe line through said booster station, means responsive to flow conditions in said pipe line for controlling the operation of a pump in said station, a detector for radioactivity responsive to passage of an interface along said pipe line, means connecting said valve-actuating means, said pump-control means and said detector for continuing operation of said station when the output of said detector increases to a predetermined value, and a timer for said last-named means for delaying return of control of said valve-controller and said pump-controller to said flow condition responsive means after said detector output has decreased to a predetermined value, whereby the booster station will remain in operation so long as interface material is contained therein and independently of said flow condition responsive means.

(References on following page)

References Cited in the file of this patent

UNITED STATES PATENTS

| | | |
|---|---|---|
| 1,279,613 | Traudt | Sept. 24, 1918 |
| 1,412,568 | Mortinsen | Apr. 11, 1922 |
| 1,873,045 | Saathoff | Aug. 23, 1932 |
| 2,049,233 | Thomas | July 28, 1936 |
| 2,330,755 | Smith | Sept. 28, 1943 |
| 2,339,957 | Smith | Jan. 25, 1944 |
| 2,461,592 | De Brabander | Feb. 15, 1949 |
| 2,651,995 | Blackburn | Sept. 15, 1953 |